(12) United States Patent
Okahata et al.

(10) Patent No.: US 6,660,818 B2
(45) Date of Patent: Dec. 9, 2003

(54) METHOD FOR PRODUCING A FLUOROPOLYMER

(75) Inventors: Yoshio Okahata, 2-11, Nijigaoka 1-chome, Asao-ku, Kawasaki-shi, Kanagawa (JP); Toshiaki Mori, Yokohama (JP); Yuri Tsuchiya, Yokohama (JP)

(73) Assignees: Asahi Glass Company, Limited, Tokyo (JP); Yoshio Okahata, Kawasaki (JP)

( * ) Notice: Subject to any disclaimer, the term of this patent is extended or adjusted under 35 U.S.C. 154(b) by 0 days.

(21) Appl. No.: 10/254,548

(22) Filed: Sep. 26, 2002

(65) Prior Publication Data

US 2003/0060664 A1 Mar. 27, 2003

(30) Foreign Application Priority Data

Sep. 27, 2001 (JP) ........................................ 2001-296067

(51) Int. Cl.⁷ .............................. C08F 2/22; C08F 2/24; C08F 2/26; C08F 2/28; C08F 2/30
(52) U.S. Cl. ........................ 526/206; 526/89; 526/229; 526/250; 526/942
(58) Field of Search ................................ 526/206, 942, 526/229, 250, 89

(56) References Cited

U.S. PATENT DOCUMENTS

| 3,522,228 | A | | 7/1970 | Fukui et al. |
| 4,166,165 | A | | 8/1979 | Hisasue et al. |
| 4,861,845 | A | | 8/1989 | Slocum et al. |
| 5,106,906 | A | | 4/1992 | Meier et al. |
| 5,478,910 | A | | 12/1995 | Russell et al. |
| 5,780,565 | A | * | 7/1998 | Clough ................ 526/206 |
| 6,497,921 | B1 | * | 12/2002 | Carbonell .............. 427/430.1 |

FOREIGN PATENT DOCUMENTS

| EP | 0 930 319 | 7/1999 |
| EP | 1 193 275 | 4/2002 |
| GB | 805115 | 11/1958 |
| JP | 10-251202 | 9/1998 |
| WO | WO 93/20116 | 10/1993 |
| WO | WO 00/47641 | 8/2000 |

* cited by examiner

*Primary Examiner*—Fred Zitomer
(74) *Attorney, Agent, or Firm*—Oblon, Spivak, McClelland, Maier & Neustadt, P.C.

(57) ABSTRACT

A method for producing a fluoropolymer, which comprises polymerizing a monomer containing a fluoromonomer having a polymerizable double bond, using an initiator, in a medium containing fluoroform and water, under a condition such that fluoroform is in a supercritical state.

20 Claims, No Drawings

METHOD FOR PRODUCING A FLUOROPOLYMER

The present invention relates to a method for producing a fluoropolymer in the presence of fluoroform and water.

Heterogeneous polymerization employing supercritical carbon dioxide has been proposed. Carbon dioxide is inexpensive and safe and presents little influence over the environment, and it is thus preferred as a solvent for polymerization. U.S. Pat. No. 5,312,882 to DeSimone et al discloses a heterogeneous polymerization method for synthesizing a water-insoluble polymer in carbon dioxide. This heterogeneous reaction mixture contains carbon dioxide, a monomer and a surfactant, but does not contain water or a water-rich phase.

Further, carbon dioxide is used as a polymerization medium for polymerization of a hydrocarbon type monomer and a fluoromonomer. For example, U.S. Pat. No. 3,522,228 to Fukui et al discloses a method for polymerizing a vinyl monomer employing a hydrocarbon type polymerization initiator in carbon dioxide. U.S. Pat. No. 4,861,845 to Slocum et al discloses a method for gas phase polymerization of tetrafluoroethylene and another fluoromonomer diluted with gaseous carbon dioxide. WO93/20116 by DeSimone of North Carolina University, discloses a method for producing a fluoropolymer, wherein a fluoromonomer is solubilized and polymerized in a solvent containing carbon dioxide. In this example, a fluoromonomer selected from the group consisting of a fluoroacrylate, a fluoroolefin, a fluorostyrene, a fluorovinyl ether and a fluoroalkylene oxide, is used.

In the foregoing examples, in each case, carbon dioxide in a supercritical state is employed, but there is no case where fluoroform in a supercritical state is used.

WO00/47641 discloses a polymerization method for a fluoropolymer in a supercritical state of a fluorocarbon. However, there is no disclosure or indication about a medium wherein a fluorocarbon in a supercritical state and water are coexistent.

It is an object of the present invention to provide a method for producing a fluoropolymer, wherein an inexpensive and environmentally preferred medium is used, and a formed polymer can be separated from the medium relatively easily. Namely, the object of the present invention is to provide a method for producing a fluoropolymer, which comprises polymerizing a monomer containing a fluoromonomer having a polymerizable double bond in a medium containing fluoroform and water, under a condition such that fluoroform is in a supercritical state.

That is, the present invention provides a method for producing a fluoropolymer, which comprises polymerizing a monomer containing a fluoromonomer having a polymerizable double bond, using an initiator, in a medium containing fluoroform and water, under a condition such that fluoroform is in a supercritical state.

Now, the present invention will be described in detail with reference to the preferred embodiments.

The method for producing a fluoropolymer of the present invention is carried out in a medium containing fluoroform and water under a condition such that fluoroform is in a supercritical state. By letting fluoroform be in a supercritical state, the dispersion state of the resulting fluoropolymer will be good.

Usually, gas becomes liquid upon application of pressure, but at a temperature higher than the critical temperature specific to the gas, it will not be liquefied even if pressure is applied and will be in a supercritical state having a nature intermediate between liquid and gas. In a supercritical state, it is capable of dissolving many substances like a liquid and exhibits high flowability like a gas. As conditions to bring fluoroform in a supercritical state, the critical temperature is about 26° C., and the pressure is at least about 48.5 MPa.

In the present invention, the degree of polymerization of the fluoropolymer to be produced, can be controlled by changing the mixing ratio of fluoroform and water as the medium. The mixing ratio of fluoroform/water in the medium is preferably from 1/99 to 99/1 by mass ratio. It is more preferably from 10/90 to 90/10, most preferably from 30/70 to 70/30.

The fluoromonomer in the present invention is a fluoromonomer having a polymerizable double bond. As such a fluoromonomer, a monomer having at least one fluorine atom, perfluoroalkyl group or perfluoroalkoxy group, which is bonded directly to the polymerizable double bond, is preferred.

Specific examples include a fluoroolefin such as tetrafluoroethylene, hexafluoropropylene, vinyl fluoride, vinylidene fluoride or chlorotrifluoroethylene, a perfluoro (alkyl vinyl ether) such as perfluoro(methyl vinyl ether), perfluoro(ethyl vinyl ether) or perfluoro(propyl vinyl ether), a perfluoro(alkyl vinyl ether) having a functional group, such as $CF_2=CFOCF_2CF(CF_3)OCF_2CF_2SO_2F$ or $CF_2=CFOCF_2CF(CF_3)OCF_2CF_2CO_2CH_3$, a fluoromonomer having an alicyclic structure, such as perfluoro(2,2-dimethyldioxazole), a fluoromonomer having a curable site, such as bromotrifluoroethylene, and a (perfluoroalkyl) ethylene having a perfluoroalkyl group having from 1 to 6 carbon atoms. These monomers may be used alone or in combination as a mixture of two or more of them. The fluoromonomer may be gaseous or liquid.

The fluoromonomer is preferably at least one member selected from the group consisting of tetrafluoroethylene, hexafluoropropylene and a perfluoro(alkyl vinyl ether), more preferably tetrafluoroethylene. Tetrafluoroethylene has good polymerizability, and the resulting polymer has a wide range of industrial applications.

It is also preferred that the monomer in the present invention contains a monomer other than the fluoromonomer. As the monomer other than the fluoromonomer, a monomer copolymerizable with the fluoromonomer, is preferred, and a hydrocarbon type monomer having a polymerizable double bond, is more preferred.

Specific examples for the monomer other than the fluoromonomer include an olefinic monomer such as ethylene, propylene, isoprene, chloroprene, butadiene or vinyl chloride, a vinyl carboxylate monomer such as vinyl acetate, a (meth)acrylate monomer such as an alkyl methacrylate, methacrylic acid, an alkyl acrylate, acrylic acid or acrylamide, a styrene monomer such as styrene or tert-butylstyrene, a vinyl ether monomer such as ethyl vinyl ether, n-butyl vinyl ether, hydroxybutyl vinyl ether or cyclohexyl vinyl ether, acrylonitrile, and maleic anhydride.

The content of the monomer is preferably from 1 to 100 parts by mass, more preferably from 5 to 50 parts by mass, per 100 parts by mass of the total of water and fluoroform as the medium.

In the method for producing a fluoropolymer of the present invention, an initiator is used. Preferably, a water-soluble initiator is used. When a water-soluble initiator is used, the residue of the initiator dissolves in the water phase after polymerization and scarcely remains as an impurity in the resulting polymer.

The water-soluble initiator may, for example, be an inorganic peroxide such as hydrogen peroxide, persulfate ions, potassium permanganate or disuccinic acid peroxide, an alkali metal persulfate or bisulfate, ammonium persulfate, ferrous sulfate, silver nitrate, copper sulfate, or a redox initiator made of a combination thereof.

The initiator is used preferably in an amount of from 0.00001 to 3.0 parts by mass, more preferably from 0.0001 to 1.0 part by mass, per 100 parts by mass of the monomer.

To the medium in the present invention, a water-soluble additive may be incorporated. Such a water-soluble additive may, for example, be a surfactant, a stabilizer, an acid, a base, a salt, a pH buffering agent or an alcohol.

The surfactant may, for example, be an anionic surfactant, a cationic surfactant, a non-ionic surfactant, an amphoteric surfactant or a polymer surfactant.

The anionic surfactant may, for example, be perfluorooctanoic acid and its salts (inclusive of sodium and ammonium salts).

The cationic surfactant is preferably e.g. a stearyltrimethylammonium halide or a laurylstearyltrimethylammonium halide (inclusive of chloride and bromide).

The nonionic surfactant is preferably e.g. polyethylene oxide lauryl ether or polyethylene oxide octyl phenyl ether.

The amphoteric surfactant is preferably e.g. dimethyllaurylbetain. The surfactant is more preferably an anionic surfactant, most preferably perfluorooctanoic acid or its salt.

The stabilizer is preferably a polymer stabilizer. Specifically, poly(vinyl alcohol), hydroxypropylcellulose, sodium styrenesulfonate, poly(ethylene oxide) or poly(acrylic acid)sodium salt, may, for example, be mentioned.

In the method for producing a fluoropolymer of the present invention, as an additive other than those mentioned above, an additive such as a chain transfer agent which has a function to control the physical or chemical properties of the resulting fluoropolymer, may be incorporated.

The chain transfer agent may, for example, be an alcohol such as methanol or ethanol, a mercaptan such as ethylmercaptan or butylmercaptan, a sulfide such as butyl sulfide, a halogenated hydrocarbon such as an alkyl iodide, perfluoroalkyl iodide, an alkyl bromide, a perfluoroalkyl bromide, carbon tetrachloride or chloroform, or an alkane such as ethane or methylcyclohexane.

In the present invention, a compound to accelerate generation of radicals from the initiator, may be incorporated. Usually, if such a compound is incorporated, the polymerization can be carried out at a low temperature as compared with a case where no such compound is incorporated. As such a compound, a reducing agent such as sodium sulfite, ammonium sulfite or sodium hydroxymethylsulfinate, which forms a redox system, sulfur dioxide, ultraviolet rays, etc., may be mentioned.

In the method for producing a fluoropolymer of the present invention, the polymerization of the monomer is carried out under such a condition that fluoroform becomes a supercritical state. Particularly, it is preferred that the temperature is from 30° C. to 200° C., and the pressure is from 10 MPa to 60 MPa, and it is more preferred that the temperature is from 60° C. to 150° C., and the pressure is from 10 MPa to 30 MPa.

The method for producing a fluoropolymer of the present invention is carried out preferably in a high pressure reactor or in a tubular reactor to polymerize the monomer in a batch system or continuously. The reactor is preferably equipped with a heating means such as an electric heater for heating to a desired temperature, a mixing means such as a paddle type stirrer, an impeller stirrer, a multistage impact counter-current stirrer or a vane type stirrer, to sufficiently mix the initiator, the medium, the monomer, etc. (hereinafter referred to as a reaction mixture), a cooling device to remove the polymerization heat, etc.

As the polymerization procedure in the present invention, the following may be mentioned as examples.

Procedure in which the monomer and the initiator are introduced into an autoclave, fluoroform and the water phase are added thereto, then the autoclave is closed, and the reaction mixture is brought to the predetermined polymerization temperature and pressure.

Procedure in which only a part of the reaction mixture is introduced into an autoclave and heated to a predetermined polymerization temperature and pressure, and the rest of the reaction mixture is supplied by a pump at a speed corresponding to the polymerization rate.

Procedure in which a part of the monomer is firstly introduced into an autoclave containing the entire amount of fluoroform, and the monomer is supplied together with the initiator to the autoclave by a pump depending upon the speed of the progress of the polymerization.

Various means may be used to separate the fluoropolymer from the reaction mixture containing fluoroform and water, after completion of the polymerization. For example, it is preferred that the fluoropolymer is separated from the reaction mixture simply by purging fluoroform into the atmosphere, and then the fluoropolymer is isolated by a physical means such as filtration.

The fluoropolymer produced by the method of the present invention, may be used for applications wherein conventional fluoropolymers are commonly used, and it may be used particularly preferably for applications such as wire coatings, gaskets, seals, container linings, hoses, elastomers, valves, bottles, films, fibers and protective coatings.

Now, the present invention will be described in further detail with reference to Examples. However, it should be understood that the present invention is by no means restricted to such specific Examples.

EXAMPLE 1

Into a 13.5 ml stainless steel reactor equipped with a stirrer chip type stirrer, 17.8 mg of ammonium persulfate and 9.45 ml of water were added. The reactor was deaerated and then sufficiently cooled by liquid nitrogen, whereupon 0.80 g of tetrafluoroethylene (hereinafter referred to as TFE) was blown thereinto. Then, while slowly adding fluoroform, the temperature was gradually raised to 40° C., and when the internal pressure became 10.1 MPa at 40° C., injection of fluoroform was terminated. Then, the internal temperature was raised to 80° C., and stirring was initiated. The stirring was continued at 80° C. for 18 hours, and then, the pressure of the reactor was released, whereupon the reactor was opened, and the content was recovered. The aqueous phase was filtered off, followed by drying to obtain 0.13 g of a fluoropolymer. The yield of the fluoropolymer was 16%. The molecular weight of the fluoropolymer calculated from the crystallization calory by DSC was about $2.1 \times 10^4$.

EXAMPLE 2

The polymerization was carried out in the same manner as in Example 1 except that the termination of the injection of fluoroform was at 40° C. under 17.2 MPa, whereby 0.16 g of a fluoropolymer was obtained. The yield of the fluoropolymer was 20%. The molecular weight of the fluoropolymer calculated from the crystallization calory by DSC was about $2.2 \times 10^4$.

EXAMPLE 3

The polymerization was carried out in the same manner as in Example 1 except that the termination of injection of fluoroform was at 40° C. under 25.3 MPa, whereby 0.21 g of a fluoropolymer was obtained. The yield of the fluoropolymer was 27%. The molecular weight of the fluoropolymer calculated from the crystallization calory by DSC was about $3.1 \times 10^4$.

According to the method of the present invention, a fluoropolymer can be produced without using a solvent which is expensive and undesirable for the environment. Fluoroform in a supercritical state is able to dissolve various monomers, whereby various fluoropolymers can be produced, and their molecular weight distribution can be made narrow. Further, fluoroform and water are used as the polymerization medium, whereby various additives may be incorporated to control the polymerization reaction or to control the structure and physical properties of the fluoropolymer to be formed. Further, separation of the obtained fluoropolymer is easy.

Further, the polymerization method of the present invention can be carried out on an industrial scale by means of a conventional polymerization apparatus.

The entire disclosure of Japanese Patent Application No. 2001-296067 filed on Sep. 27, 2001 including specification, claims and summary is incorporated herein by reference in its entirety.

What is claimed is:

1. A method which comprises
    polymerizing a monomer mixture comprising at least one fluoromonomer having a polymerizable double bond, in a two phase medium comprising fluoroform and water, in the presence of an initiator,
    wherein the fluoroform is in a supercritical state.

2. The method according to claim 1, wherein the fluoromonomer is at least one member selected from the group consisting of tetrafluoroethylene, vinylidene fluoride, hexafluoropropylene and a perfluoro(alkyl vinyl ether).

3. The method according to claim 1, wherein the fluoromonomer is tetrafluoroethylene.

4. The method according to claim 1, wherein the initiator is a water-soluble initiator.

5. The method of claim 1, wherein the fluoroform to water ratio is from 10/90 to 90/10.

6. The method of claim 1, wherein the fluoroform to water ratio is from 30/70 to 70/30.

7. The method of claim 1, wherein the polymerizing is carried out at a pressure of from 10 MPa to 60 MPa and a temperature of from 30° C. to 200° C.

8. The method of claim 1, wherein the polymerizing is carried out at a pressure of from 10 MPa to 30 MPa and a temperature of from 60° C. to 150° C.

9. The method of claim 1, wherein the pressure of the monomer mixture in the two-phase medium is 10.1 MPa at 40° C.

10. The method of claim 1, wherein the pressure of the monomer mixture in the two-phase medium is 17.2 MPa at 40° C.

11. The method of claim 1, wherein the pressure of the monomer mixture in the two-phase medium is 25.3 MPa at 40° C.

12. The method of claim 1, wherein the monomer mixture further comprises a monomer other than the fluoromonomer.

13. The method of claim 12, wherein the other monomer is a hydrocarbon monomer having a polymerizable double bond.

14. The method of claim 1, wherein the monomer mixture further comprises an olefinic monomer.

15. The method of claim 1, wherein the initiator is selected from the group consisting of hydrogen peroxide, a persulfate ion, potassium permanganate, an alkyl metal persulfate, an alkali metal bisulfate, an ammonium persulfate, a ferrous sulfate, silver nitrate, copper sulfate and a mixture thereof.

16. The method of claim 1, wherein the medium further comprises a water-soluble additive.

17. The method of claim 1, wherein the medium further comprises a water-soluble additive selected from the group consisting of a surfactant, a stabilizer, an acid, a base, a salt, a pH buffering agent and an alcohol.

18. The method of claim 1, wherein the medium further comprises a surfactant selected from the group consisting of an anionic surfactant, a cationic surfactant, a non-ionic surfactant, an amphoteric surfactant and a polymer surfactant.

19. The method of claim 1, further comprising:
    isolating the polymerized monomer by filtering, then drying.

20. A polymer comprising polymerized units of at least one fluoromonomer obtained by the process of claim 1.

* * * * *